United States Patent Office.

ELIHU ENGLAND, OF MOSSY CREEK, TENNESSEE.

Letters Patent No. 104,719, dated June 28, 1870.

---

IMPROVED COMPOUND FOR STUFFING AND TANNING HIDES.

---

The Schedule referred to in these Letters Patent and making part of the same.

---

To all whom it may concern:

Be it known that I, ELIHU ENGLAND, of the village of Mossy Creek, in the county of Jefferson and State of Tennessee, have discovered a new and useful Compound to be used as a Stuffing in the Process of Tanning Hides; and I do hereby declare that the following is a full and exact description of the same.

My invention relates to the process of tanning hides of animals, and consists in a novel compound of materials designed to serve as stuffing, and especially adapted for use in the process secured to me by Letters Patent of March 29, 1870.

My composition for stuffing is formed as follows, namely:

I take one pound of tanners' oil, one pound of wood-tar, and four pounds of soap, and mix them thoroughly together. When thus prepared, the mixture is ready for use.

The compound above described is intended especially for use in stuffing skins before the application of tannin thereto, the object being to remove or destroy the adipose tissues of the skin by means of the stuffing, and prepare the fibers for the reception of the tannin.

I do not claim, broadly, the use of wood-tar for tanning purposes, as I am aware other inventors have used that substance for tanning; but

What I claim as my invention is—

The composition herein described, to be used as stuffing prior to, and as a preparation for tanning, in the process described in my patent of March 29, 1870.

ELIHU ENGLAND.

Witnesses:
P. M. CHURCHMAN,
R. H. ASHMORE.